US010090073B2

(12) United States Patent
Zahzam et al.

(10) Patent No.: US 10,090,073 B2
(45) Date of Patent: Oct. 2, 2018

(54) MEASUREMENT BY MEANS OF ATOMIC INTERFEROMETRY WITH MULTIPLE SPECIES OF ATOMS

(71) Applicant: ONERA (OFFICE NATIONAL D'ETUDES ET DE RECHERCHES AEROSPATIALES), Palaiseau (FR)

(72) Inventors: Nassim Zahzam, Palaiseau (FR); Yannick Bidel, Palaiseau (FR); Alexandre Bresson, Palaiseau (FR); Alexis Bonnin, Palaiseau (FR)

(73) Assignee: ONERA (OFFICE NATIONAL D'ETUDES ET DE RECHERCHES AEROSPATIALES, Palaiseau (FR)

( * ) Notice: Subject to any disclaimer, the term of this patent is extended or adjusted under 35 U.S.C. 154(b) by 0 days.

(21) Appl. No.: 15/551,451

(22) PCT Filed: Feb. 10, 2016

(86) PCT No.: PCT/FR2016/050298
§ 371 (c)(1),
(2) Date: Aug. 16, 2017

(87) PCT Pub. No.: WO2016/132046
PCT Pub. Date: Aug. 25, 2016

(65) Prior Publication Data
US 2018/0040388 A1    Feb. 8, 2018

(30) Foreign Application Priority Data
Feb. 16, 2015    (FR) ...................................... 15 51271

(51) Int. Cl.
*G21K 1/00* (2006.01)

(52) U.S. Cl.
CPC .................................... *G21K 1/006* (2013.01)

(58) Field of Classification Search
CPC ....................................................... G21K 1/006
USPC ......................................................... 250/251
See application file for complete search history.

(56) References Cited

PUBLICATIONS

Schlippert, et al ("Quantum Test of the Universality of Free Fall" Phys. Rev. Lett. vol. 112, No. 20, May 22, 2014 pp. 203002-1-203002-5).*
Jun. 3, 2016, International Search Report issued for International Application No. PCT/FR2016/050298.
D. Schlippert, et al., Quantum Test of the Universality of Free Fall, Physical Review Letters, May 22, 2014, pp. 203002-1-203002-5, vol. 112, No. 20, American Physical Society.
C.C.N. Kuhn, et al., A Bose-condensed, simultaneous dual species Mach-Zehnder atom interferometer, New Journal of Physics, Jul. 24, 2014, pp. 1-7, vol. 16, No. 7, Institute of Physics Publishing, Bristol, GB.

(Continued)

*Primary Examiner* — Michael Maskell
(74) *Attorney, Agent, or Firm* — Young & Thompson

(57) ABSTRACT

Disclosed is a method for measuring an external parameter by atomic interferometry using two sets of atoms that belong to different species. Two measurements are taken simultaneously at the same location, but independently from one another, in order to obtain two measurement results. Constant phase shifts that appear in the atomic interferences for the two atom sets are quadrature-adjusted in order to ensure that one of the two measurements provides a value for the external parameter with satisfactory accuracy.

20 Claims, 4 Drawing Sheets

(56) References Cited

PUBLICATIONS

A. Bonnin, et al., Simultaneous dual-species matter-wave accelerometer, Physical Review A, Oct. 11, 2013, pp. 043615-1-043615-5, vol. 88, No. 4, American Physical Society.
C. Schubert, et al., Differential atom interferometry with 87Rb and 85Rb for testing the UFF in STE-QUEST, Dec. 20, 2013, pp. 1-21.
G.M. Tino, et al., Precision Gravity Tests with Atom Interferometry in Space, Nuclear Physics B: Proceedings Supplements, 2013, pp. 203-217, Elsevier B.V.
Sheng-Wey Chiow, et al., 102hk Large Area Atom Interferometers, Physical Review Letters, Sep. 23, 2011, pp. 130403-1-130403-5, vol. 107, American Physical Society.
Q. Bodart, et al., A cold atom pyramidal gravimeter with a single laser beam, Applied Physics Letters, 2010, pp. 134101-1-134101-3, vol. 96, American Institute of Physics.
F. Sorrentino, et al., Simultaneous measurement of gravity acceleration and gravity gradient with an atom interferometer, Applied Physics Letters, 2012, pp. 114106-1-114106-4, vol. 101, American Institute of Physics.
Mark Kasevich, et al., Atomic Interferometry Using Stimulated Raman Transitions, Physical Review Letters, Jul. 8, 1991, pp. 181-184, vol. 67, No. 2, the American Physical Society.

\* cited by examiner

MEASUREMENT BY MEANS OF ATOMIC INTERFEROMETRY WITH MULTIPLE SPECIES OF ATOMS

The present invention relates to a method of measurement by atomic interferometry, as well as apparatus for implementing this method.

Measurement of an inertial quantity by atomic interferometry is known. The inertial quantity can be a gravitational field coordinate or a coordinate of an acceleration that atoms used for the measurement are subjected to.

In order to carry out such a measurement, a set of atoms is cooled to a temperature of a few microkelvins, and then subjected to a sequence of interactions with photons in order to form an atomic interference. The phase shift that appeared in the resulting matter-wave function for the set of atoms to during the formation of the atomic interference is then measured. In a known manner, when the set of atoms is subject to an acceleration during the formation of the interference, the phase shift is $\Delta\Phi_{tot} = k \cdot a \times T^2 + \Delta\Phi_{op}$, where k is the wave vector that corresponds to the momentum received or transferred by one of the atoms during each interaction between the atoms and the photons, a is the vector of the acceleration that the atoms are subjected to, · denotes the scalar product operation between the vectors k and a, T is a base time that separates successive laser pulses in the sequence of interactions between the atoms and the photons that forms the interference, and $\Delta\Phi_{op}$ is a constant phase shift that depends on the manner of producing the interference conditions. More precisely, the constant phase shift $\Delta\Phi_{op}$ depends on operating conditions that are undergone reproducibly and on operating parameters that are controlled.

Actually, the measurement result, denoted P, is not the phase shift $\Delta\Phi_{tot}$ directly, but a value that depends on this phase shift via a periodic function, according to the formula $P = P_0 \cdot [1 - C \times \cos(\Delta\Phi_{tot})]$, where $P_0$ and C are two non-zero numbers. Owing to the form of the variations of the function $P(\Delta\Phi_{tot})$, the value of the phase shift $\Delta\Phi_{tot}$ can only be deduced with satisfactory accuracy from the value of the measurement result P when this value of the phase shift $\Delta\Phi_{tot}$ belongs to limited and separate intervals. Between these intervals, i.e. when the phase shift $\Delta\Phi_{tot}$ is close to one of the values $n \times \Pi$, n being an integer, the derivative values of the function $P(\Delta\Phi_{tot})$ are low, in absolute values, so that the value of the phase shift $\Delta\Phi_{tot}$ can no longer be deduced with satisfactory accuracy. Now, the set of values of the phase shift $\Delta\Phi_{tot}$ that are not obtained accurately is large enough to reduce the benefits of the method of measurement by atomic interferometry.

Moreover, producing atomic interference with two sets of atoms of different species, at one and same location and at one and same time point, is lo known, in particular from the article entitled "Simultaneous Dual-Species Matter-Wave Accelerometer", by A. Bonnin, N. Zahzam, Y. Bidel and A. Bresson, Phys. Rev. A 88, 043615 (2013). Each set of atoms then provides a measurement result independently of the other set of atoms.

Finally, the article entitled "Simultaneous measurement of gravity acceleration and gravity gradient with an atom interferometer", by F. Sorrentino et al., Appl. Phys. Lett. 101, 114106 (2012), describes an atomic interference gradiometer. With the type of apparatus in this document, two measurements are performed simultaneously using two sets of atoms of one and same species, but located in two measurement locations that are remote from one another.

Starting from this situation, a purpose of the present invention is to improve the accuracy with which any value of acceleration can be measured using apparatus for measurement by atomic interferometry.

An additional purpose of the invention is to obtain said improvement in accuracy without significantly increasing the complexity, weight, bulk or price of the apparatus for measurement by atomic interferometry.

To achieve this, a first aspect of the invention proposes a method of measurement by atomic interferometry in which each session of measurements is executed with at least two sets of atoms, each of which is subjected to conditions of formation of an atomic interference. The atoms of each set of atoms are of a species that is dedicated to this set of atoms and is different from the species of atoms of each other set of atoms.

For each session of measurements, the conditions of formation of an atomic interference are produced for each set of atoms throughout a volume that is associated with this set of atoms and that contains at least one point in common with the volume associated with each other set of atoms. In other words, the atomic interferences are produced in one and same location for all the sets of atoms, so that the measurement results that are obtained for the different sets of atoms all relate to this same location.

Moreover, the conditions of formation of the atomic interference are produced for each set of atoms between a start time point and an end time point respectively before and after an intermediate time point that is common to all the sets of atoms. In other words, the atomic interferences are produced simultaneously for all the sets of atoms, so that the measurement results that are obtained for the different sets of atoms all relate to the intermediate time point.

A measurement result is then obtained in each session of measurements independently for each set of atoms, each measurement result varying according to a first function of a total phase shift that appeared for the set of atoms during the formation of the atomic interference. This total phase shift comprises in turn a sum of a second function of an external parameter of which a value is sought and of a constant phase shift to which the corresponding set of atoms is subject during the formation of the corresponding atomic interference. Under these conditions, the method of the invention comprises the following steps:

/1/ during a session of measurements, applying a value for at least one operating parameter, called internal parameter, which makes it possible to control a difference between the constant phase shifts to which the two sets of atoms are respectively subjected, the value(s) applied for the internal parameter(s) being such that a difference between the total phase shifts to which the two sets of atoms are respectively subjected is between $\Pi/4$ and $3\Pi/4$, in absolute value and modulo $\Pi$:

/2/ for each measurement result that is obtained for one of the sets of atoms in the session of measurements, determining a derivative value of this measurement result with respect to the external parameter, this derivative being evaluated for the measurement result;

/3/ selecting that one of the sets of atoms for which the derivative value that was determined in step /2/ is largest in absolute value; and /4/ calculating the value of the external parameter from that one of the measurement results that was obtained in step /2/ for the set of atoms selected in step /3/.

Thus, according to the invention, the multiplicity of the sets of atoms that are used for one and same session of measurements provides a redundancy of results. This redundancy is combined with control of the operating conditions for the measurements that belong to one and same session. Accordingly, poor accuracy that may affect calculation of the value of the external parameter from one of the measurement results, obtained for one of the sets of atoms, can be compensated by another measurement result that is obtained in the same session for another set of atoms. In general, the present invention therefore implements multiple measurements that are performed simultaneously and at the same location, but with operating conditions and a value of at least one internal parameter that are different for each measurement so that one of the measurements always provides a value for the external parameter with satisfactory accuracy. According to the invention, selection of the value of the internal parameter can be carried out initially during design of the apparatus for measurement by atomic interferometry, or can be updated periodically, or updated before carrying out a new session of measurements.

In the case when two sets of atoms lead individually to satisfactory accuracy for the value of the external parameter, the overall accuracy can also be improved by the invention, through the effect of multiple measurements.

In various implementations of the invention, the internal parameter(s) that is (are) used for adjusting the difference between the total phase shifts may comprise:
- at least one amplitude of a phase jump introduced between two pulses of laser radiation that are used to form the atomic interference for one of the sets of atoms;
- at least one rate of variation of a frequency of laser radiation that is used to form the atomic interference for one of the sets of atoms;
- an intensity and a gradient of a magnetic field that is applied to the sets of atoms during the formation of the atomic interferences; or
- a combination of several of the preceding internal parameters.

Advantageously, the value(s) that is (are) applied for the internal parameter(s) may be such that the difference between the total phase shifts to which the two sets of atoms are respectively subjected is between $3\Pi/8$ and $5\Pi/8$, preferably $7\Pi/16$ and $9\Pi/16$, in absolute value and modulo $\Pi$.

Even more advantageously, this difference between the total phase shifts may be between $15\Pi/32$ and $17\Pi/32$, in absolute value and modulo if In this case, for that one of the sets of atoms that is selected in step /3/, the first function may be replaced with an affine function of the total phase shift that appeared during the formation of the atomic interference for the selected set of atoms, in a whole interval of values that has an interval length greater than or equal to $3\Pi/8$ and that contains the total phase shift that appeared during the formation of the atomic interference.

The first function can have the expression $P=P_0 \cdot [1-C \times \cos(\Delta\Phi_{tot})]$ for each set of atoms, where P denotes the measurement result, $\Delta\Phi_{tot}$ is the total phase shift that appeared during the formation of the atomic interference for this set of atoms, and $P_0$ and C are two non-zero numbers.

The total phase shift may be directly the sum of the second function and the constant phase shift: $\Delta\Phi_{tot}=\Delta\Phi(a)+\Delta\Phi_{op}$, where a denotes the external parameter, $\Delta\Phi(a)$ is the second function of this external parameter for the set of atoms considered, and $\Delta\Phi_{op}$ is the constant phase shift for the same set of atoms.

For each set of atoms, the second function may be of affine function type. In this case, and if the magnetic field is zero or if its gradient is zero, a slope coefficient of this affine function may be equal to $k \times T^2$, where T is a base time for a sequence of interactions between the atoms and photons that is implemented for forming the atomic interference, and k is the modulus of a momentum received or transferred by one of the atoms during each interaction between the atoms and the photons, divided by $h/(2\Pi)=\hbar$, where h is Planck's constant.

When the internal parameter comprises an amplitude of a phase jump introduced between two pulses of laser radiation that are used in order to form the atomic interference for one of the sets of atoms, the constant phase shift that is undergone by this set of atoms may comprise a term proportional to the amplitude of the phase jump.

When the internal parameter comprises a rate of variation of frequency of laser radiation that is used to form the atomic interference for one of the sets of atoms, the constant phase shift that is undergone by this set of atoms may comprise the term $-2\Pi \times \alpha \times T^2$, where T is once again the base time for the sequence of interactions between the atoms and photons that is implemented to form the atomic interference of the set of atoms concerned, and a is the rate of variation of the frequency of the laser radiation.

When the internal parameter comprises an intensity and a gradient of a magnetic field that is applied to the sets of atoms during formation of the atomic interferences, the constant phase shift that is undergone by each set of atoms may comprise the term $(A_{at}/M_{at}) \times B_0 \times B_1 \times \hbar \times k \times T^2$, where $B_0$ and $B_1$ are the intensity and the gradient of the magnetic field respectively, T is once again the base time for the sequence of interactions between the atoms and photons that is implemented to form the atomic interference for the set of atoms, k is once again the modulus of a momentum received or transferred by one of the atoms during each interaction between the atoms and the photons, divided by $\hbar=h/(2\Pi)$ where h is Planck's constant, and $A_{at}/M_{at}$ is a coefficient that depends on the species of atoms.

In various implementations of the invention, two of the species of atoms, which are dedicated to different sets of atoms used in one and same session of measurements, may be the rubidium isotopes 85 and 87. Alternatively, they may be respective isotopes of rubidium and caesium, or of rubidium and potassium.

In general, the external parameter may be a coordinate of a gravitational field, or a coordinate of an acceleration that the atoms are subjected to.

A second aspect of the invention proposes an apparatus for measurement by atomic interferometry that comprises:
- a source of atoms suitable for producing at least two sets of atoms, with the atoms of each set of atoms that are of a species dedicated to this set of atoms and different from the species of atoms of each other set of atoms;
- means suitable for producing conditions of atomic interference for each set of atoms, in such a way that these conditions are produced for each set of atoms throughout a volume that is associated with the set of atoms and that contains at least one point in common with the volume associated with each other set of atoms, and are produced between a start time point and an end time point respectively before and after an intermediate time point that is common to all the sets of atoms, so as to constitute a session of measurements;
- a detection device, which is arranged to provide measurement results respectively and independently for all the sets of atoms of each session of measurements; and
- an analysis unit, which is suitable for calculating at least one value of an external parameter from each measurement result.

According to the invention, the apparatus is suitable for implementing a method that complies with the first aspect of the invention as described above, including its variants and its improvements.

Advantageously, for each session of measurements, the conditions of atomic interferences may be produced for all the sets of atoms using a single laser assembly, which is common to these sets of atoms.

Such apparatus may in particular form an accelerometer, a gravimeter or a gyrometer.

Other particular features and advantages of the present invention will become apparent from the following description of non-limitative implementation examples, with reference to the attached drawings, in which.

For sake of clarity, the dimensions of the elements that are shown in these figures do not correspond to real dimensions or to proportions of real dimensions. Moreover, identical references that are indicated in different figures denote elements that are identical or that have identical functions.

Figure 1:
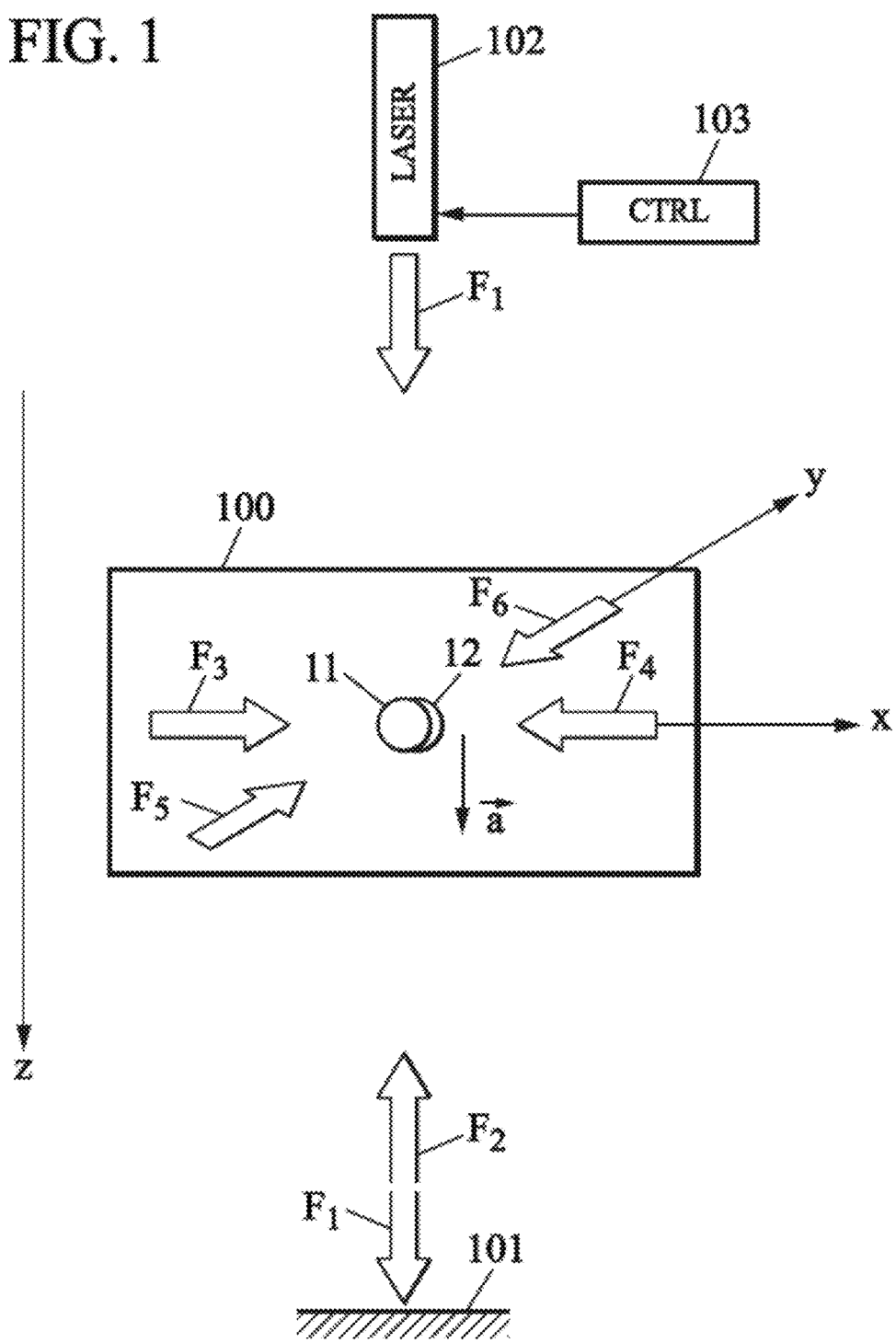
FIG. 1 is a principle diagram of an apparatus for measurement by atomic interferometry according to the present invention.
Figure 2:
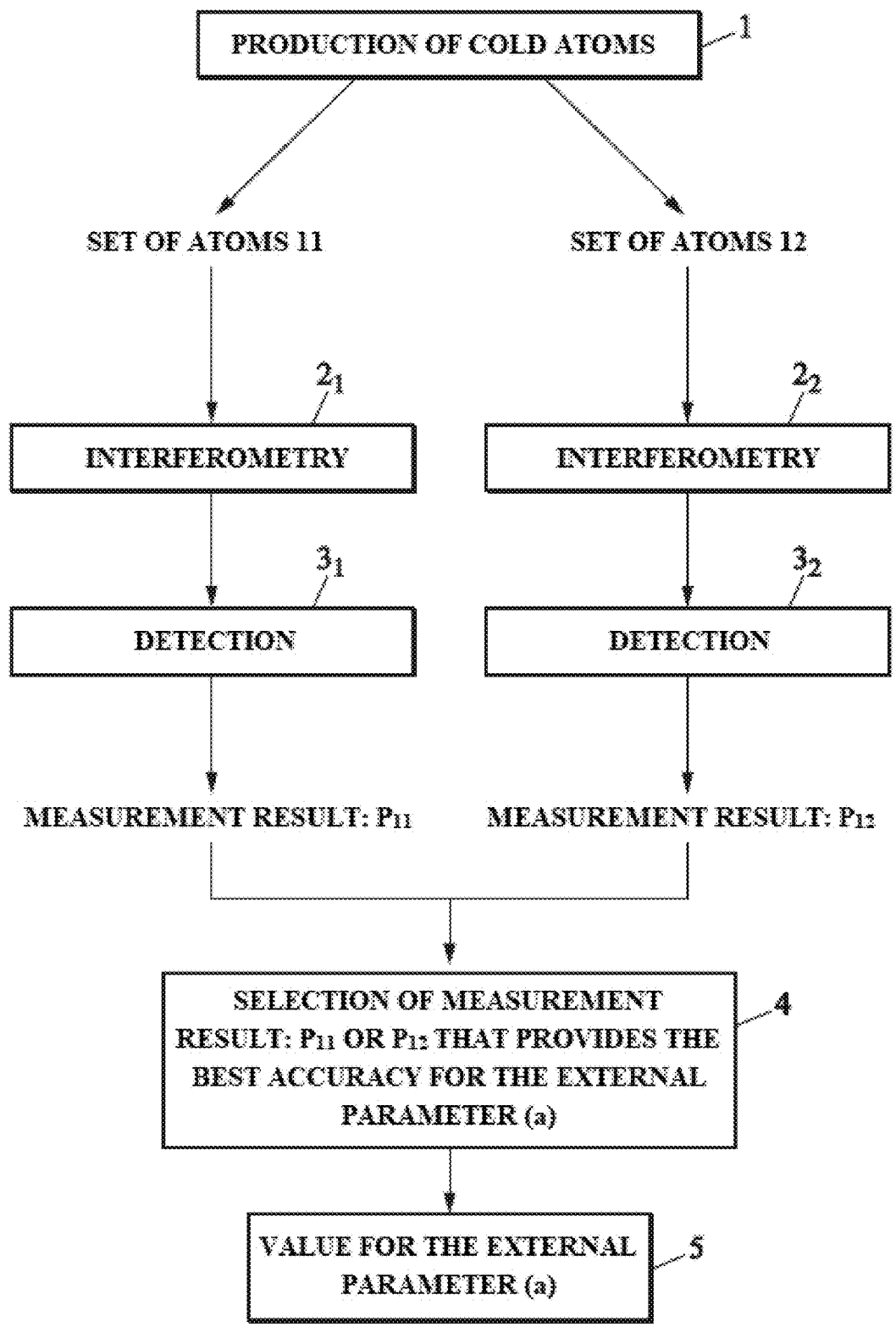
FIG. 2 shows steps of a session of measurements carried out using the apparatus according to FIG. 1.

As shown in FIGS. 1 and 2, an apparatus according to the invention comprises a source of atoms 100 that is used for producing two sets of cold atoms 11 and 12, corresponding to step 1 in FIG. 2. Preferably, the atoms of set 11 may be $^{85}$Rb atoms, and those of set 12 may be $^{87}$Rb atoms. The source 100 has the function of trapping the atoms of each set 11, 12 and cooling them to a specified temperature. It may have one of the structures known to a person skilled in the art, such as a magneto-optical trap. Such a trap comprises a pair of coils (not shown) in anti-Helmholtz configuration, which are supplied with electric current during a first phase of operation of the trap in order to create a magnetic field gradient at the location in which each set of atoms is held. Three pairs of laser beams cross at this location, propagating in opposite directions for two beams of one and same pair. Thus, beams $F_1$ and $F_2$ propagate in opposite directions along the z axis, beams $F_3$ and $F_4$ along the x axis and beams $F_5$ and $F_6$ along the y axis. Different methods of forming beams $F_1$-$F_6$, in particular using reflecting mirrors such as mirror 101 in order to reduce the number of laser sources that are required, are so well known that it is not necessary to repeat them. In a second phase of operation of the magneto-optical trap, the magnetic field gradient is suppressed and the radiation frequencies of the laser beams are detuned in order to obtain the sets of cold atoms 11 and 12, called molasses.

Actually, the source 100 may comprise two injectors of atoms, of $^{85}$Rb and of $^{87}$Rb respectively, and the magneto-optical trap is controlled in order to produce two entangled trapping structures, that are intended for the $^{85}$Rb atoms and the $^{87}$Rb atoms respectively. The source 100 is adjusted so that the two sets 11 and 12 are available at the same time and at the same location, for each to be subjected to a sequence of interactions with photons independently of the other set of atoms.

The sequences of interactions with the photons are then produced simultaneously for the two sets of atoms 11 and 12, corresponding to steps $2_1$ and $2_2$, in order to produce an atomic interference for each of these sets independently of the other set. Each sequence may comprise a series of laser pulses in order to cause stimulated transitions between two states of the atoms of set 11 or 12 to which the sequence is dedicated. Several sequences of pulses may be used alternately, including that which is usually called "Mach-Zehnder" and is described in the article entitled "Atomic interferometry using stimulated Raman transitions", by M. Kasevich et al., Phys. Rev. Lett. 67, pp. 181-184 (1991) and which is recalled now:

a first pulse, called π/2 pulse and having a splitting function for the wave function of the initial set of atoms, in order to produce two atomic wave packets;

a second pulse, called π and having an atomic mirror function for each atomic wave packet; and then a third pulse, again π/2 and having a function of recombination of the atomic wave packets.

Figure 3:
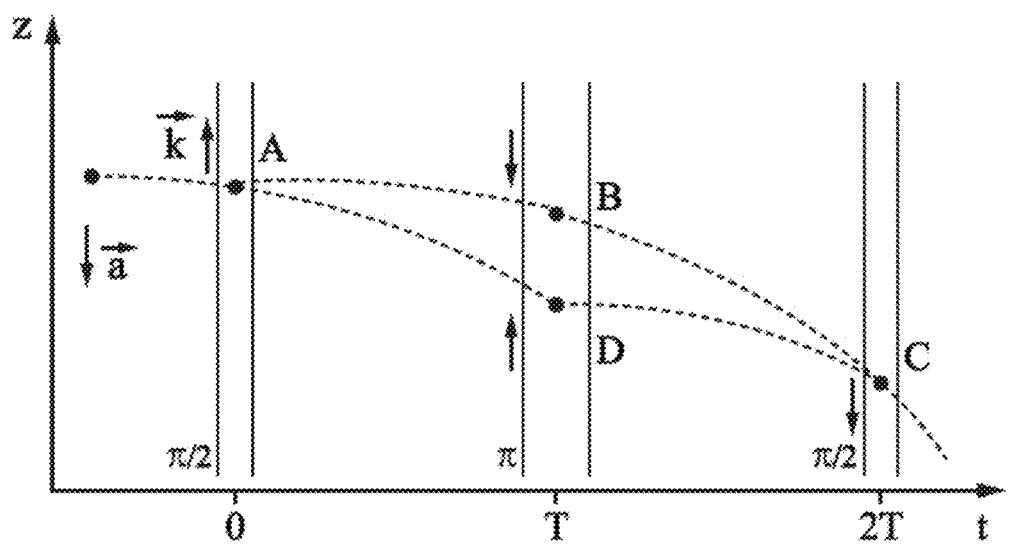
FIG. 3 shows a particular sequence of interactions for creating an atomic interference, which can be used for implementing the invention.

This sequence of interactions is shown in FIG. 3, in which t denotes time, and A, B, C and D denote the interactions that a part of the set of atoms in question is subjected to each time. k denotes the moduli of the wave vector $k_{11}$ and $k_{12}$ alternately, which are defined just afterwards for the sets of atoms 11 or 12 respectively, and similarly for T, which denotes the base times $T_{11}$ and $T_{12}$ alternately.

Each interaction of one of the laser pulses with an atom of one of the sets 11/12 is generally of the multiphoton type, and uses the two laser beams $F_1$ and $F_2$, which propagate in opposite directions in parallel with a common direction (see FIG. 1). The modulus of the wave vector $k_{11/12}$ then corresponds to the total momentum $p_{tot}$ that is transferred to the atom—i.e. received or lost by the atom—during such multiphoton interaction: $k_{11/12}=2\Pi P_{tot}/h=N_{11/12}\times k_{laser}=N_{11/12}\times 2\Pi/\lambda_{laser}$, where h is Planck's constant, $k_{laser}$ and $\lambda_{laser}$ are respectively the modulus of the wave vector and the wavelength of the laser radiation constituting beams $F_1$ and $F_2$ ($k_{laser}=2\Pi/\lambda_{laser}$), and $N_{11}$ and $N_{12}$ denote the numbers of photons that are involved in each multiphoton interaction, for an atom of set 11 or for an atom of set 12, respectively. The two numbers $N_{11}$ and $N_{12}$ can be selected independently of one another, from the conditions of formation of the atomic interference for the set of atoms in question. Thus, these conditions determine the types of multiphoton interactions that are generated and the number $N_{11/12}$ of photons that are involved in each interaction. For example, each multiphoton interaction may be a diffraction of the atoms by optical gratings that are formed with beams $F_1$ and $F_2$, in Bragg mode or in Bloch oscillation mode with atomic transitions without internal change of state for the atoms. The article entitled "102ℏk Large Area Atom Interferometers" by S-w. Chiow, T. Kovachy, H-C. Chien and M. A. Kasevich, Phys. Rev. Lett. 107, 130403 (2011), describes employing multiphoton Bragg interactions by producing each pulse of radiation of the sequence that forms the atomic interference in the form of a series of base subpulses. Alternatively, each multiphoton interaction may be a Raman transition, or a double diffraction by an optical grating, i.e. atomic transitions that are accompanied by changes of the internal state of the atom.

$T_{11/12}$ is the base time that separates the successive laser pulses in the sequence of interactions between the atoms of the set 11/12 and the photons. In the Mach-Zehnder sequence pulses described above, $T_{11/12}$ is the length of time that separates the first pulse with a splitting function from the second pulse with a mirror function, and that also separates this second pulse from the third pulse with a recombination function. $T_{11}$ thus relates to the sequence of pulses that is used to form the atomic interference of the set of atoms 11, and $T_{12}$ relates to the sequence of pulses that is used to form the atomic interference of the set of atoms 12. For example, the base times $T_{11}$ and $T_{12}$ may be between 50 ms (millisecond) and 150 ms.

In general, the two sequences of interactions, the types of the interactions between the atoms and the laser radiation and the base times that are used separately for the two sets of atoms, may be identical or different.

In particular, the apparatus configuration that is described in the article "A cold atom pyramidal gravimeter with a single laser beam", by Q. Bodart et al., Appl. Phys. Lett. 96, 134101 (2010), may be adopted. The magneto-optical trap and the means for producing the conditions of atomic interference are produced using a single laser source assembly, comprising the laser source 102 and the control unit 103. Such an apparatus configuration is simple, economical and very compact. Moreover, the same laser source assembly can be used for both sets of atoms 11 and 12, as described in the article entitled "Simultaneous Dual-Species Matter-Wave Accelerometer", by A. Bonnin, N. Zahzam, Y. Bidel and A. Bresson, Phys. Rev. A 88, 043615 (2013), so that it has the following four functions:

trapping and cooling the atoms of set 11;
trapping and cooling the atoms of set 12;
producing the pulses for creating the atomic wave interferences for the set of atoms 11; and
producing the pulses for creating the atomic wave interferences for the set of atoms 12.

Each interferometry measurement then proceeds by detection of the proportion of the atoms of the corresponding set that are in a specified state, for example one of two fundamental hyperfine states. Several different techniques are known to a person skilled in the art for carrying out such a detection. For example, it may be a measurement of light absorption, with pulses of radiation the wavelength of which is selected in order to cause absorption from just one of the hyperfine atomic states. Such detections are carried out independently for the two sets of atoms 11 and 12, according to steps $3_1$ and $3_2$ in FIG. 2. Suitable detection devices are also assumed to be known, and are not shown in FIG. 1 for the sake of clarity.

A first measurement result, denoted $P_{11}$, is thus obtained for the set of atoms 11, and a second measurement result, denoted $P_{12}$, is also obtained for the set of atoms 12. The set of steps formed by the production of the two sets of atoms 11 and 12 (step 1), the production of the simultaneous sequences of interactions with photons, for the two sets of atoms respectively (steps $2_1$ and $2_2$), and the two detections of the proportions of atoms that are finally in a specified state for obtaining the measurement results $P_{11}$ and $P_{12}$ (steps $3_1$ and $3_2$), constitute a session of measurements. Such a session is characterized by the simultaneity of the sequences of interactions that produce the atomic interferences, and the co-localization of the sets of atoms during these sequences, whereas the atoms of the two sets are of different species.

Under these conditions, the measurement result $P_{11}$ is linked to the component a along the z axis of the acceleration a that the atoms of set 11 undergo, by the following two relationships:

$$P_{11}=P_0 \cdot [1-C \times \cos(\Delta\Phi_{tot}|_{11})]$$

$$\Delta\Phi_{tot}|_{11}=\Delta\Phi_{11}(a)+\Delta\Phi_{op}|_{11}$$

where $P_0$ and C are two known non-zero numbers;

$\Delta\Phi_{tot}|_{11}$ is the total phase shift undergone by the atoms of set 11 during the formation of the atomic interference that is intended for them;

$\Delta\Phi_{11}(a)$ is the part of the total phase shift $\Delta\Phi_{tot}|_{11}$ that is caused by the acceleration component a. In particular, when the magnetic field is zero or uniform during formation of the atomic interference for the set of atoms 11:

$$\Delta\Phi_{11}(a)=k_{11} \times T_{11}^2 \times a; \text{ and}$$

$\Delta\Phi_{op}|_{11}$ is the constant phase shift, which depends on the manner of producing the interference conditions for the set of atoms 11. The constant phase shift $\Delta\Phi_{op}|_{11}$ depends on operating conditions that are undergone reproducibly, and on parameters internal to the atomic interferometry apparatus, which are controlled for each measurement carried out with the set of atoms 11.

In the same way, for the atoms of set 12, the measurement result $P_{12}$ is linked to the same value of component a along the z axis of the acceleration a by the following two other relationships:

$$P_{12}=P_0' \cdot [1-C' \times \cos(\Delta\Phi_{tot}|_{12})]$$

$$\Delta\Phi_{tot}|_{12}=\Delta\Phi_{12}(a)+\Delta\Phi_{op}|_{12}$$

where $P_0'$ and C' are two known non-zero numbers, which may or may not be different from $P_0$ and C;

$\Delta\Phi_{tot}|_{12}$ is the total phase shift undergone by the atoms of set 12 during the formation of the atomic interference that is intended for them, $\Delta\Phi_{12}(a)$ is the part of the total phase shift $\Delta\Phi_{tot}|_{12}$ that is caused by the acceleration component a. Once again, in particular, when the magnetic field is zero or uniform during formation of the atomic interference for the set of atoms 12: $\Delta\Phi_{12}(a)=k_{12} \times T_{12}^2 \times a$; and $\Delta\Phi_{op}|_{12}$ is the constant phase shift, which depends on the manner of producing the interference conditions for the set of atoms 12. It also depends on the operating conditions that are undergone reproducibly, and on internal parameters that are controlled for each measurement carried out with the set of atoms 12.

In connection with the terms that have been used in the general part of the present description:

$P_{11}$ as a function of $\Delta\Phi_{tot}|_{11}$ has been called first function, effective for the set of atoms 11;
$\Delta\Phi_{11}$ as a function of a, has been called second function, effective for the set of atoms 11;
$P_{12}$ as a function of $\Delta\Phi_{tot}|_{12}$ has also been called first function, but effective for the set of atoms 12;
$\Delta\Phi_{12}$ as a function of a, has also been called second function, but effective for the set of atoms 12; and
a is the external parameter the value of which is sought.

The external parameter a that is measured may be a component of an acceleration, for example due to a translational or rotational movement of a device carrying the apparatus for measurement by atomic interferometry, or may be a component of a gravitational field in which the apparatus is located.

The first functions $P_{11}(\Delta\Phi_{tot}|_{11})$ and $P_{12}(\Delta\Phi_{tot}|_{12})$ are not necessarily identical for implementing the invention, but they will be assumed to be identical in the remainder of the present description, for the sake of simplicity.

Similarly, the second functions $\Delta\Phi_{11}(a)$ and $\Delta\Phi_{12}(a)$ are not necessarily identical, in particular when the types of interactions of the atoms with the laser radiation, and/or the sequences of interactions are different for the two sets of atoms 11 and 12, and/or when a magnetic field gradient is applied to the sets of atoms 11 and 12 during formation of the atomic interferences.

According to the invention, the conditions of formation of the atomic interferences for the sets of atoms 11 and 12 are selected so that the difference between the total phase shifts $\Delta\Phi_{tot}|_{11}$ and $\Delta\Phi_{tot}|_{12}$ is of the order of $\Pi/2$ in absolute value and modulo $\Pi$, for example equal to $\Pi/2$. This quadrature relationship ensures that the two cosines of the functions $P_{11}(\Delta\Phi_{tot}|_{11})$ and $P_{12}(\Delta\Phi_{tot}|_{12})$ are not equal to +1 or −1 simultaneously, so that one of the two sets of atoms 11 and 12, for which the value of the cosine is sufficiently different from +1 and −1, makes it possible to determine the acceleration component a with satisfactory accuracy. However, that one of the sets of atoms 11 or 12 that provides the value of the acceleration component a with the best accuracy may change as a function of the value of a that is finally obtained. However, the invention ensures that one or the other of the two sets of atoms provides the value of a with satisfactory accuracy.

Moreover, the difference between the total phase shifts $\Delta\Phi_{tot}|_{11}$ and $\Delta\Phi_{tot}|_{12}$ may only be adjusted to the value $\Pi/2$ or close to this value, in absolute value and modulo $\Pi$, in a restricted interval around the real value of the acceleration component a. Indeed, as stated above, the two terms $\Delta\Phi_{11}(a)$ and $\Delta\Phi_{12}(a)$ of the total phase shifts $\Delta\Phi_{tot}|_{11}$ and $\Delta\Phi_{tot12}$ may be different, so that a quadrature relationship that exists for one value of the acceleration component a no longer exists for another possible value of the acceleration component a. The quadrature relationship, exact or in an approximate extent, is therefore necessary for the value of the acceleration component a that is finally deduced from each session of measurements.

A first implementation of the invention uses at least one phase jump between two pulses of laser radiation of the sequence that is used for the set of atoms 11. It may be assumed by way of example that this sequence is of the Mach-Zehnder type that was described above, and the respective phases of the laser radiation of the pulses are compared when they are referred to one and same time point and one and same point in space. The difference that appears under these conditions between the phases of the laser radiation of two pulses of the sequence is called the phase jump. In a known manner, such phase jump can easily be adjusted to any value, between 0 and $2\Pi$, the zero value being possible, using microwave sources, in particular for laser radiation from Raman sources. Then the constant phase shift $\Delta\Phi_{op}|_{11}$ that is present in the wave function of the atoms of set 11 at the end of the atomic interference is: $\Delta\Phi_{op}|_{11} = \Phi_1 - 2\times\Phi_2 + \Phi_3$, where $\Phi_1$, $\Phi_2$ and $\Phi_3$ denote the respective phases of the laser radiation of the three successive pulses of the Mach-Zehnder sequence, when these phases are brought to the same time point and to the same point in space. For example, when a phase jump of amplitude $\delta\Pi$ is introduced between the first pulse with the splitting function and the second pulse with the mirror function, and no phase jump is introduced between this second pulse and the third pulse with the recombination function, then: $\Phi_2 = \Phi_3 = \Phi_1 + \delta\Phi$ and $\Delta\Phi_{op}|_{11} = -\delta\Phi + \Delta\Phi_{inv}|_{11}$ where $\Delta\Phi_{inv}|_{11}$ is a phase shift of atomic interference which may exist unintentionally, for example owing to the apparatus used. In principle, the unintentional phase shift $\Delta\Phi_{inv}|_{11}$ is constant and reproducible for successive sessions of measurements. In general for a Mach-Zehnder sequence: $\Delta\Phi_{op}|_{11} = \Delta\Phi_{2-3}|_{11} - \Delta\Phi_{1-2}|_{11}$, where $\Phi_{1-2}|_{11}$ is the amplitude of the phase jump between the first pulse and the second for the set of atoms 11, and $\Phi_{2-3}|_{11}$ is the amplitude of the phase jump between the second pulse and the third for the same set of atoms. By controlling the amplitudes of the phase jumps for the two sets of atoms 11 and 12 separately, each in the way that has just been described for the set of atoms 11, the difference between the total phase shifts $\Delta\Phi_{tot}|_{11}$ and $\Delta\Phi_{tot}|_{12}$ can be adjusted to $\Pi/2$ modulo $\Pi$, whatever the unintentional phase shifts $\Delta\Phi_{tot}|_{11}$ and $\Delta\Phi_{tot}|_{12}$ that may exist for the two sets of atoms 11 and 12 respectively.

Figure 4B:
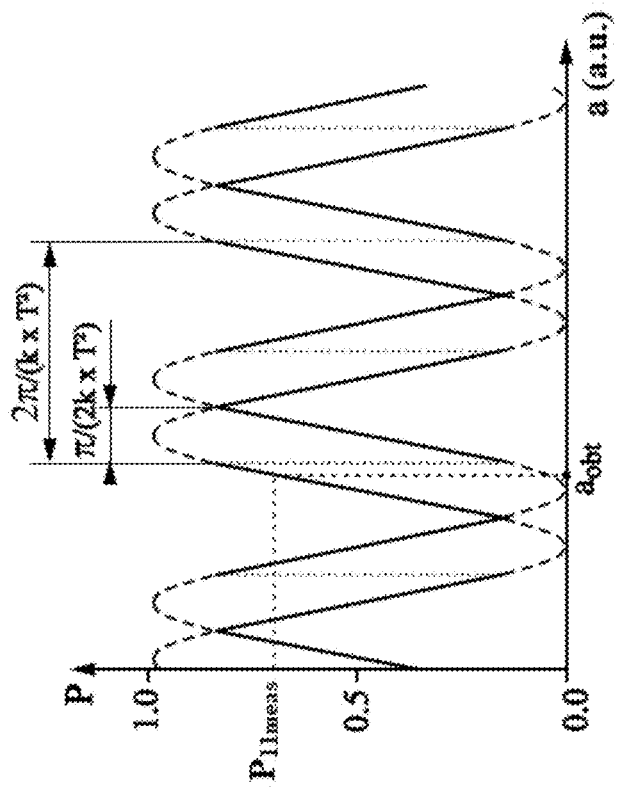
FIG. 4b is a simplified version of the diagram in FIG. 4a, proposed for certain implementations of the invention.
Figure 4A:
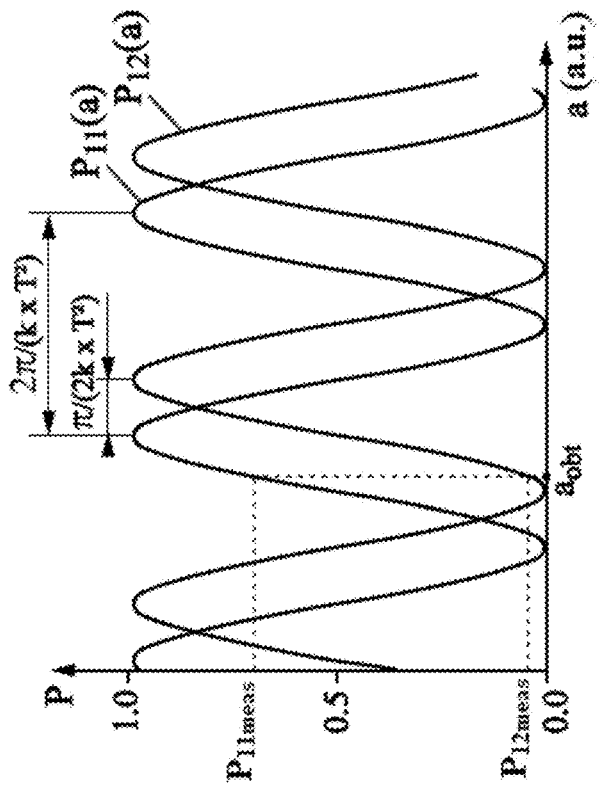
FIG. 4a is a diagram showing how a value for an external parameter is obtained using a method according to the invention.

FIG. 4a shows such implementation of the invention. For the purposes of illustration, the following values were adopted for the constants: $P_0 = P_0' = 0.5$ and $C = C' = 1.0$. In the diagram, the horizontal axis gives the values of the external parameter a in arbitrary units, and the vertical axis, generically denoted P, gives the values of the measurement results $P_{11}$ and $P_{12}$. The two curves denoted $P_{11}(a)$ and $P_{12}(a)$ correspond to the formulae that were given above. They therefore have a common period, equal to $2\Pi/(k\times T^2)$, and are displaced from one another by $\Pi/(2\times k\times T^2)$, where k is the modulus of the wave vector that corresponds to the momentum transferred at each interaction between an atom and the laser radiation of a pulse, and T is the base time of the sequences of pulses. The values of k and T are assumed to be common to both sets of atoms 11 and 12, so that the second function of the acceleration component a, thus common to both sets of atoms, is $\Delta\Phi_{11}(a) = \Delta\Phi_{12}(a) = k\times T^2 \times a$. For a real value of the acceleration component a, the diagram shows the two measurement results that are obtained in one and the same session of measurements: $P_{11meas}(a)$ for the set of atoms 11 and $P_{12meas}(a)$ for the set of atoms 12. The value of the external parameter a that is deduced from each session of measurements is therefore the common abscissa value in the diagram in FIG. 4a, which solves the two equations $P_{11}(a) = P_{11meas}$ and $P_{12}(a) = P_{12meas}$ simultaneously. In the example shown, the measurement result $P_{12meas}$ is located close to an extremum (minimum in this case) of the curve $P_{12}(a)$. The derivative of $P_{12}(a)$ with respect to the acceleration component a, at this location on the curve is low in absolute value, so that deducing the value of the acceleration component a from this measurement result $P_{12meas}$ does not have good accuracy. In contrast, the derivative of $P_{11}(a)$ with respect to the acceleration component a, for the same value of the acceleration component a, is greater than that of $P_{12}(a)$, in absolute values. For this reason, the measurement result value $P_{11meas}$ makes it possible to deduce the value of the acceleration component (a) with better accuracy than is provided by the measurement result value $P_{12meas}$. This analysis of the measurement results $P_{11meas}$ and $P_{12meas}$ for arriving at the value of the external parameter a corresponds to steps 4 and 5 in FIG. 2 and can be executed by an analysis unit (not shown) using a dedicated program. In FIG. 4a, the value for the acceleration component a that is thus obtained from one of the two curves $P_{11}(a)$ or $P_{12}(a)$, here $P_{11}(a)$ in the example shown, is denoted $a_{obt}$.

Based on these considerations, the diagram in FIG. 4b is deduced from that in FIG. 4a, only retaining, for each real value of the acceleration component a, the portion of that of the two curves $P_{11}(a)$ and $P_{12}(a)$ that provides the best accuracy. The relationship between the measurement results $P_{11}$ and $P_{12}$ on the one hand, and the value of the acceleration component a on the other hand, is then made up of segments that belong in turn to one or other of the two curves $P_{11}(a)$ and $P_{12}(a)$, changing the curve at each intersection between the latter. Moreover, the inventors found that each segment of curve thus identified could be replaced with a rectilinear segment joining the two points of intersection of curves $P_{11}(a)$ and $P_{12}(a)$, which define the ends of the segment in question. Each rectilinear segment then has a length equal to $\Pi/(2\times k\times T^2)$ in projection on the horizontal axis, corresponding to a length equal to $\Pi/2$ when it is expressed with respect to the total phase shifts.

A second implementation of the invention uses at least one of the rates of variation of frequency of the laser radiation that is used to form the atomic interferences for the sets of atoms 11 and 12. If $\alpha_{11}$ and $\alpha_{12}$ denote these rates of variation of frequency of laser radiation, for the two sets of atoms 11 and 12 respectively, then $\Delta\Phi_{op}|_{11} = -2\Pi \times \alpha_{11} \times T_{11}^2$ and $\Delta\Phi_{op}|_{12} = -2\Pi \times \alpha_{12} \times T_{12}^2$. Subject to the same hypotheses of identity of the interactions between atoms and radiation, of identity of the sequences of pulses between the two sets of atoms 11 and 12, and of identity of the base times, the diagrams in FIGS. 4a and 4b also apply to this second embodiment of the invention.

A third implementation of the invention uses a magnetic field gradient to which the two sets of atoms 11 and 12 are subjected during formation of the respective atomic interferences. For this, a component of the magnetic field B along the z axis may vary linearly as a function of the z coordinate (FIG. 1) as to follows: $B(z) = B_0 + B_1 \times z$, where $B_0$ is the average intensity and $B_1$ is the gradient of the magnetic field. Advantageously, the magnetic field $B(z)$ may be produced by coils in anti-Helmholtz configuration of the magneto-optical trap. Then, the second function of the acceleration component a has an additional term, according to the following relationship for the set of atoms 11:

$$\Delta\Phi_{11}(a) = k_{11} \times T_{11}^2 \times a + 2A_{at}|_{11} \times B_0 \times B_1 \times T_{11}^3 \times a$$

where $A_{at}|_{11} = -2\ \mu_B^2/(\hbar^2 G_{at}|_{11})$, $\mu_B$ denoting the Bohr magneton, $G_{at}|_{11}$ denoting the energy difference between the two hyperfine states of the Raman transition of the atoms of set 11, when such interaction between atoms and radiation is used, and $\hbar$ being equal to $h/(2\Pi)$ where $h$ is Planck's constant. Simultaneously, the constant phase shift becomes:

$$\Delta\Phi_{op}|_{11} = A_{at}|_{11} \times B_0 \times B_1 \times \hbar \times k_{11} \times T_{11}^2/M_{at}|_{11} + \Delta\Phi_{inv}|_{11}$$

where $M_{at}|_{11}$ denotes the mass of each atom of set 11.

Similarly, the second function of the acceleration component a for the set of atoms 12 becomes, in the presence of the magnetic field gradient B:

$$\Delta\Phi_{12}(a) = k_{12} \times T_{12}^2 \times a + 2A_{at}|_{12} \times B_0 \times B_1 \times T_{12}^3 \times a$$

and for the constant phase shift:

$$\Delta\Phi_{op}|_{12} = A_{at}|_{12} \times B_0 \times B_1 \times \hbar \times k_{12} \times T_{12}^2/M_{at}|_{12} + \Delta\Phi_{inv12}$$

where $A_{at}|_{12} = -2\ \mu_B^2/(\hbar^2 G_{at}|_{12})$, $G_{at}|_{12}$ denoting the energy difference between the two hyperfine states of the Raman transition of the atoms of set 12, and $M_{at}|_{12}$ denoting the mass of each atom of set 12. For example, when the atoms of set 11 are the $^{85}$Rb isotope: $A_{at}|_{11} = -2\Pi \times 1290 \times 10^8$ Hz/T$^2$ and $M_{at}|_1 = 1.410 \times 10^{-25}$ kg, and when the atoms of set 12 are the $^{87}$Rb isotope: $A_{at}|_{12} = -2\ \Pi \times 573 \times 10^8$ Hz/T$^2$ and $M_{at}|_{12} = 1.443 \times 10^{-25}$ kg. Thus, it is possible to select suitable values for the intensity $B_0$ and the gradient $B_1$ of the magnetic field, for which the difference between the total phase shifts $\Delta\Phi_{tot}|_{11}$ and $\Delta\Phi_{tot}|_{12}$ is once again equal to $\Pi/2$ modulo $\Pi$. Depending on the method used for producing the magnetic field, its intensity $B_0$ and its gradient $B_1$ may be proportional to one another. However, owing to the difference in value between the two coefficients $A_{at}|_{11}$ and $A_{at}|_{12}$, the periods of the two curves $P_{11}(a)$ and $P_{12}(a)$ are no longer identical even when $k_{11} = k_{12}$ and $T_{11} = T_{12}$, so that the quadrature relationship is only adjusted by the invention locally, around the value $a_{obt}$ of the acceleration component a.

It is understood that the invention can be modified or adapted relative to the detailed description that has just been given. In particular, the pulse sequence that forms each atomic interference is not necessarily of the Mach-Zehnder type, but can be replaced with one of the other sequences known to a person skilled in the art for forming atomic interference.

The three embodiments that have been described, using the phase jumps between successive pulses of the laser radiation, the rate of variation of the frequency of the laser radiation, and the magnetic field, can be combined. The contributions to the phase shifts that are accumulated during formation of each atomic interference are then added together.

Finally, the type of each interaction between atoms and photons that is caused in each sequence can be varied, provided that the combination of the interactions of the sequence once again forms an atomic interference, and that the wave vectors associated with the total momenta that are transferred to the atoms during these interactions satisfy the present invention.

The invention claimed is:

1. Method of measurement by atomic interferometry, in which each session of measurements is executed with at least two sets of atoms (11, 12) each subjected to conditions of formation of atomic interference, the atoms of each set of atoms (11, 12) being of a species dedicated to said set of atoms and different from the species of atoms of each other set of atoms, method in which, for each session of measurements, said conditions are produced for each set of atoms (11, 12) throughout a volume that is associated with said set of atoms and that contains at least one point in common with the volume associated with each other set of atoms, and are produced between a start time point and an end time point respectively before and after an intermediate time point common to all the sets of atoms, and in which a measurement result ($P_{11}$, $P_{12}$) is obtained in each session of measurements independently for each set of atoms (11, 12), each measurement result varying according to a first function of a total phase shift that appeared for the corresponding set of atoms during formation of the atomic interference, said total phase shift comprising a sum of a second function of an external parameter (a) a value of which is sought and of a constant phase shift that is undergone by the corresponding set of atoms during said formation of the atomic interference, the method being comprising the following steps:

/1/ during a session of measurements, applying a value for at least one operating parameter, called internal parameter and making it possible to control a difference between the constant phase shifts to which the two sets of atoms are respectively subjected, the value applied for said at least one internal parameter being such that a difference between the total phase shifts that the two sets of atoms (11, 12) undergo, respectively, is between $\Pi/4$ and $3\Pi/4$ in absolute value and modulo $\Pi$;

/2/ for each measurement result ($P_{11}$, $P_{12}$) obtained for one of the sets of atoms (11, 12) in said session of measurements, determining a derivative value of said measurement result with respect to the external parameter (a), said derivative being evaluated for said measurement result;

/3/ selecting that one of the sets of atoms (11, 12) for which the derivative value determined in step /2/ is largest in absolute value; and /4/ calculating the value of the external parameter (a) from the measurement result ($P_{11}$, $P_{12}$) obtained in step /2/ for the set of atoms selected in step /3/.

2. Method according to claim 1, in which said at least one internal parameter comprises at least one amplitude of a phase jump introduced between two pulses of laser radiation that are used to form the atomic interference for one of the sets of atoms (11, 12), at least one rate of variation of a frequency of laser radiation that is used to form the atomic interference for one of the sets of atoms, or an intensity and a gradient of a magnetic field that is applied to the sets of atoms during the formation of the atomic interferences, or a combination of several among said at least one amplitude of phase jump, said at least one rate of variation of frequency of laser radiation and said magnetic field intensity and gradient.

3. Method according to claim 1, in which the value applied for said at least one internal parameter is such that the difference between the total phase shifts that the two sets of atoms (11, 12) undergo, respectively, is between $15\Pi/32$ and $17\Pi/32$, in absolute value and modulo $\Pi$,
    and in which, for that one of the sets of atoms (11, 12) that is selected in step /3/, the first function is replaced with an affine function of the total phase shift that appeared during the formation of the atomic interference for the selected set of atoms, in a whole interval of values having a length of interval greater than or equal to $3\Pi/8$, and which contains said total phase shift that appeared during the formation of the atomic interference.

4. Method according to claim 1, in which the first function has the expression $P=P_0 \cdot [1-C \times \cos(\Delta\Phi_{tot})]$ for each set of atoms (11, 12), where P denotes the measurement result, $\Delta\Phi_{tot}$ is the total phase shift that appeared during the formation of the atomic interference for said set of atoms, and $P_0$ and C are two non-zero numbers.

5. Method according to claim 1, in which said at least one internal parameter comprises an amplitude of a phase jump introduced between two pulses of laser radiation that are used to form the atomic interference for one of the sets of atoms (11, 12), and the constant phase shift that is undergone by said set of atoms comprises a term proportional to the amplitude of the phase jump.

6. Method according to claim 1, in which said at least one internal parameter comprises a rate of variation of frequency of laser radiation that is used to form the atomic interference for one of the sets of atoms (11, 12), and the constant phase shift that is undergone by said set of atoms comprises the term $-2\Pi \times \alpha \times T^2$ where T is a base time for a sequence of interactions between the atoms and photons that is implemented to form the atomic interference of said set of atoms, and $\alpha$ is the rate of variation of frequency of the laser radiation.

7. Method according to claim 1, in which said at least one internal parameter comprises an intensity and a gradient of a magnetic field that is applied to the sets of atoms (11, 12) during the formation of the atomic interferences, and the constant phase shift that is undergone by each set of atoms comprises the term $(A_{at}/M_{at}) \times B_0 \times B_1 \times \hbar \times k \times T^2$, where $B_0$ and $B_1$ are the intensity and the gradient of the magnetic field respectively, T is a base time for a sequence of interactions between the atoms and photons that is implemented to form the atomic interference for said set of atoms, k is a modulus of a momentum received or transferred by one of the atoms during each interaction between the atoms and the photons, divided by $\hbar=h/(2\Pi)$ where h is Planck's constant, and $A_{at}/M_{at}$ is a coefficient that depends on the species of atoms.

8. Apparatus for measurement by atomic interferometry comprising:
    a source of atoms (100) suitable for producing at least two sets of atoms (11, 12), with the atoms of each set of atoms that are of a species dedicated to said set of atoms and different from the species of atoms of each other set of atoms;
    means (101-103) suitable for producing conditions of atomic interference for each set of atoms (11, 12), so that said conditions are produced for each set of atoms throughout a volume that is associated with said set of atoms and that contains at least one point in common with the volume associated with each other set of atoms, and produced between a start time point and an end time point respectively before and after an intermediate time point that is common to all the sets of atoms, so as to constitute a session of measurements;
    a detection device arranged for providing measurement results ($P_{11}$, $P_{12}$) respectively and independently for all the sets of atoms (11, 12) of each session of measurements; and
    an analysis unit suitable for calculating at least one value of an external parameter (a) from each measurement result ($P_{11}$, $P_{12}$),
    in which each measurement result ($P_{11}$, $P_{12}$) varies according to a first function of a total phase shift that appeared for the corresponding set of atoms during the formation of the atomic interference, said total phase shift comprising a sum of a second function of the external parameter (a) the value of which is sought and of a constant phase shift that is undergone by the corresponding set of atoms during said formation of the atomic interference,
    the apparatus being applying, during each session of measurements, a value for at least one operating parameter, called an internal parameter and making it possible to control a difference between the constant phase shifts that the two sets of atoms (11, 12) undergo, respectively, so that a difference between the total phase shifts to which the two sets of atoms are subjected respectively, is between $\Pi/4$ and $3\Pi/4$, in absolute value and modulo $\Pi$;
    and the analysis unit is suitable for executing steps /2/ to /4/ of a method of measurement by atomic interferometry according to claim 1.

9. Apparatus according to claim 8, in which, for each session of measurements, the conditions of atomic interferences are produced for all the sets of atoms (11, 12) using a single laser source assembly (102, 103), common to said sets of atoms.

10. Apparatus according to claim 8, forming an accelerometer, a gravimeter or a gyrometer.

11. Method according to claim 2, in which the value applied for said at least one internal parameter is such that the difference between the total phase shifts that the two sets of atoms (11, 12) undergo, respectively, is between $15\Pi/32$ and $17\Pi/32$, in absolute value and modulo $\Pi$,
    and in which, for that one of the sets of atoms (11, 12) that is selected in step /3/, the first function is replaced with an affine function of the total phase shift that appeared during the formation of the atomic interference for the selected set of atoms, in a whole interval of values having a length of interval greater than or equal to $3\Pi/8$, and which contains said total phase shift that appeared during the formation of the atomic interference.

12. Method according to claim 2, in which the first function has the expression $P=P_0 \cdot [1-C \times \cos(\Delta\Phi_{tot})]$ for each set of atoms (11, 12), where P denotes the measurement result, $\Delta\Phi_{tot}$ is the total phase shift that appeared during the formation of the atomic interference for said set of atoms, and $P_0$ and C are two non-zero numbers.

13. Method according to claim 3, in which the first function has the expression $P=P_0 \cdot [1-C \times \cos(\Delta\Phi_{tot})]$ for each set of atoms (11, 12), where P denotes the measurement result, $\Delta\Phi_{tot}$ is the total phase shift that appeared during the formation of the atomic interference for said set of atoms, and $P_0$ and C are two non-zero numbers.

14. Method according to claim 2, in which said at least one internal parameter comprises an amplitude of a phase jump introduced between two pulses of laser radiation that are used to form the atomic interference for one of the sets of atoms (11, 12), and the constant phase shift that is undergone by said set of atoms comprises a term proportional to the amplitude of the phase jump.

15. Method according to claim 3, in which said at least one internal parameter comprises an amplitude of a phase jump introduced between two pulses of laser radiation that are used to form the atomic interference for one of the sets of atoms (11, 12), and the constant phase shift that is undergone by said set of atoms comprises a term proportional to the amplitude of the phase jump.

16. Method according to claim 4, in which said at least one internal parameter comprises an amplitude of a phase jump introduced between two pulses of laser radiation that are used to form the atomic interference for one of the sets of atoms (11, 12), and the constant phase shift that is undergone by said set of atoms comprises a term proportional to the amplitude of the phase jump.

17. Method according to claim 2, in which said at least one internal parameter comprises a rate of variation of frequency of laser radiation that is used to form the atomic interference for one of the sets of atoms (11, 12), and the constant phase shift that is undergone by said set of atoms comprises the term $-2\Pi \times \alpha \times T^2$, where T is a base time for a sequence of interactions between the atoms and photons that is implemented to form the atomic interference of said set of atoms, and $\alpha$ is the rate of variation of frequency of the laser radiation.

18. Method according to claim 3, in which said at least one internal parameter comprises a rate of variation of frequency of laser radiation that is used to form the atomic interference for one of the sets of atoms (11, 12), and the constant phase shift that is undergone by said set of atoms comprises the term $-2\Pi \times \alpha \times T^2$, where T is a base time for a sequence of interactions between the atoms and photons that is implemented to form the atomic interference of said set of atoms, and $\alpha$ is the rate of variation of frequency of the laser radiation.

19. Method according to claim 4, in which said at least one internal parameter comprises a rate of variation of frequency of laser radiation that is used to form the atomic interference for one of the sets of atoms (11, 12), and the constant phase shift that is undergone by said set of atoms comprises the term $-2\Pi \times \alpha \times T^2$, where T is a base time for a sequence of interactions between the atoms and photons that is implemented to form the atomic interference of said set of atoms, and $\alpha$ is the rate of variation of frequency of the laser radiation.

20. Method according to claim 5, in which said at least one internal parameter comprises a rate of variation of frequency of laser radiation that is used to form the atomic interference for one of the sets of atoms (11, 12), and the constant phase shift that is undergone by said set of atoms comprises the term $-2\Pi \times \alpha \times T^2$, where T is a base time for a sequence of interactions between the atoms and photons that is implemented to form the atomic interference of said set of atoms, and $\alpha$ is the rate of variation of frequency of the laser radiation.

* * * * *